United States Patent
Hierholzer et al.

(10) Patent No.: US 7,126,919 B2
(45) Date of Patent: Oct. 24, 2006

(54) METHOD FOR ASSURING THE QUALITY OF SERVICE OF CONNECTIONS BETWEEN SUBREGIONS OF A PACKET-ORIENTED NETWORK HAVING A RESOURCE MANAGER

(75) Inventors: Peter Hierholzer, Wielenbach (DE); Harald Mueller, Gilching (DE); Karl Klaghofer, Munich (DE); Christian Prehofer, Munich (DE); Josef Glasmann, Pfaffenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 802 days.

(21) Appl. No.: 09/847,603

(22) Filed: May 3, 2001

(65) Prior Publication Data

US 2002/0003809 A1    Jan. 10, 2002

(30) Foreign Application Priority Data

May 3, 2000    (DE)    ................................. 100 21 502

(51) Int. Cl.
- H04J 1/16    (2006.01)
- H04J 3/16    (2006.01)
- H04L 12/28    (2006.01)

(52) U.S. Cl. .................... 370/236; 370/400; 370/468
(58) Field of Classification Search ................ None
See application file for complete search history.

(56) References Cited

U.S. PATENT DOCUMENTS

| | | | |
|---|---|---|---|
| 6,252,857 B1 * | 6/2001 | Fendick et al. | 370/254 |
| 6,341,309 B1 * | 1/2002 | Vaid et al. | 709/223 |
| 6,483,835 B1 * | 11/2002 | Tanigawa et al. | 370/395.21 |
| 6,529,499 B1 * | 3/2003 | Doshi et al. | 370/352 |
| 6,577,628 B1 * | 6/2003 | Hejza | 370/392 |
| 6,590,865 B1 * | 7/2003 | Ibaraki et al. | 370/230 |
| 6,600,735 B1 * | 7/2003 | Iwama et al. | 370/352 |

(Continued)

FOREIGN PATENT DOCUMENTS

EP    0692892    1/1996

(Continued)

OTHER PUBLICATIONS

"Study Group 16: Annex N of H.323 End to End Quality of Service (QoS) Control and Signaling in H.323 Systems", ITU—Telecommunication Standardization Sector, 2000, pp. 1-56.

(Continued)

*Primary Examiner*—Andrew C. Lee
(74) *Attorney, Agent, or Firm*—Staas & Halsey LLP

(57) ABSTRACT

Quality of service is assured for connections routed via a plurality of subregions of a packet-oriented network via connection paths having prescribed transmission system resources by a resource manager in the packet-oriented network which has access to associated information relating to address ranges of the subregions, routes from source subregions to destination subregions through other subregions, and prescribed transmission system resources between the subregions. When a connection is initialized, a requested scope of resources and source and destination addresses are signaled to the resource manager, and a route through the network is ascertained. Then, taking into account the requested scope of resources and the scope of resources between the subregions of the route, a check is carried out to determine whether the initialized connection is authorized. In addition, the transmission system resources may be reserved for the initialized connection in the subregions included in the ascertained route. The resource manager can be arranged centrally in the network in one of the subregions, and the connection controllers, e.g., the gatekeeper in H.323 networks, provided in the subregions involve the resource manager in the signaling that occurs when a connection is initialized.

13 Claims, 1 Drawing Sheet

U.S. PATENT DOCUMENTS 6,609,316 B1 * 8/2003 Ohba et al. ............ 370/395.42
6,708,209 B1 * 3/2004 Ebata et al. ................ 709/223
6,795,918 B1 * 9/2004 Trolan ........................ 713/160

FOREIGN PATENT DOCUMENTS

| EP | 0798942 | 10/1997 |
|----|---------|---------|
| EP | 0851706 | 7/1998 |
| EP | 0989705 | 3/2000 |
| EP | 1047226 | 10/2000 |
| GB | 2331659 | 5/1999 |
| WO | 99/53719 | 10/1999 |

OTHER PUBLICATIONS

Jim Toga, Intel Corporation; Proposals and General Comments for Inter-Gatekeeper Communications: Proposal for Annex G; Jun. 8-12, 1998; pp. 1-9.

Office Action dated Jun. 22, 2005 for European Patent Application 01 105 610.8.

* cited by examiner

METHOD FOR ASSURING THE QUALITY OF SERVICE OF CONNECTIONS BETWEEN SUBREGIONS OF A PACKET-ORIENTED NETWORK HAVING A RESOURCE MANAGER

BACKGROUND OF THE INVENTION

In connectionless, packet-oriented networks, such as on the Internet or in networks based on ITU-T Standard H.323, no quality of service is guaranteed for connections between terminals in these networks. The quality of service also comprises the bandwidth and the transmission speed which is provided for a connection.

In the case of data or voice transmission in local area networks, that is to say in packet-oriented networks, the quality of service is assured by over-dimensioning the transmission system resources, since high bandwidths can be achieved inexpensively in local area networks. Frequently, subregions of local area networks—for example company-internal communication networks—are connected to one another to form other local area networks—a number of branch offices having a number of subsidiary branch offices. Since the subregions of the local area networks are usually provided at geographically different locations, leased lines are usually provided for the connections between these subregions. To assure a sufficient quality of service for connection paths routed between the subregions via these lines, there must only be as many connections routed via this connection path between the networks as there are available transmission system resources, a transmission system resource being demanded for each connection during connection initialization. In most applications, central units are provided which coordinate and monitor the connections within a subregion. By way of example, a packet-oriented multimedia communication system based on ITU-T Standard H.323 contains, for each of the subregions, gatekeepers which control and monitor data links and voice links—in the case of access to the Internet, also Voice over Internet links. Since the route through the network which is provided for each connection frequently runs via a plurality of subregions, it is a complex matter to monitor the bandwidth for each individual connection over the data paths for all connections beyond the respective subregions as well. To do this, it is necessary to know the exact switching paths for the connections within the subregions or within the local area network. However, the very high level of complexity means that such implementation is not economical in the gatekeepers of the multimedia communication systems based on Standard H.323.

Another alternative for assuring the quality of service in connections routed between subregions of a local area network is to over-dimension the connection paths between the subregions of the local area network. Such a solution requires a high level of additional technical and hence also financial input.

SUMMARY OF THE INVENTION

An object on which the invention is based is to assure the quality of service for connections which are usually routed via a plurality of subregions of a packet-oriented network via connection paths having prescribed transmission system resources.

A fundamental aspect of the method according to the invention is that the packet-oriented network contains a resource manager having associated information relating to address ranges of the subregions, routes, starting from the respective subregions via subregions to other subregions, and the prescribed transmission system resources between the subregions. When a connection is initialized, the requested scope of resources and the source and destination addresses are signaled to the resource manager, and also the route through the network is ascertained and, taking into account the requested scope of resources and the scope of resources between the subregions of the route, a check is carried out to determine whether the initialized connection is authorized. Advantageously, the transmission system resources are reserved for the initialized connection in the subregions included in the ascertained route. The fundamental advantage of the method according to the invention can be seen in that a very abstract topological model of the network is stored in the resource manager, which is used to monitor, in particular, the transmission system resources of the connection paths arranged between the subregions, and hence to assure the quality of service of the connections routed via the connection paths. The resource manager can be arranged centrally in the network in one of the subregions, and the connection controllers, e.g., the gatekeeper in H.323 networks, provided in the subregions involve the resource manager in the signaling when a connection is initialized. This reduces the level of administrative and hence financial input on account of the simple, abstract topological model, and, in addition, considerably shortens the inquiry time, i.e., the checking time for a connection's authorization monitoring.

In accordance with one development of the method according to the invention, the subregions of the network are subdivided into further subregions, the further subregions each having been allocated a portion of the transmission system resources of the at least one connection path (VS). This means that, for different services, e.g., voice and data service, the quality of service or the prescribed transmission system resources can be determined differently for each service.

Advantageously, the packet-oriented network is the Internet or an access network for the Internet. In this context, the address ranges of the subregions are represented by subranges of an Internet address. Preferably, the first ranges of the Internet address are provided for the allocation to the subregions.

Advantageously, the resource manager has a table for the routes which respectively contains an item of information relating to the source subregion, an item of information relating to the destination subregion, information relating to the subregions situated in between, and information relating to the connection paths arranged between the subregions of the respective routes.

In accordance with another advantageous embodiment of the method according to the invention, the prescribed transmission system resources between the subregions are subdivided into prescribed transmission system partial resources for specific services, with the partial resource for the specific service being taken into account for the authorization check for an initialized connection associated with a particular service. This allows the transmission system resources of the connection paths to be used on the basis of specific services.

Advantageously, the transmission system resources requested by the initialized connections and authorized are summed in the resource manager for each connection path between the subregions, and an initialized connection whose requested transmission system resource exceeds the prescribed transmission system resources of a connection path arranged in the ascertained route, taking into account the summed transmission system resources, is not authorized. If a connection is ended, the transmission system resources for the connection routed via the connection paths in question are subtracted again, i.e., are released for other connections again.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
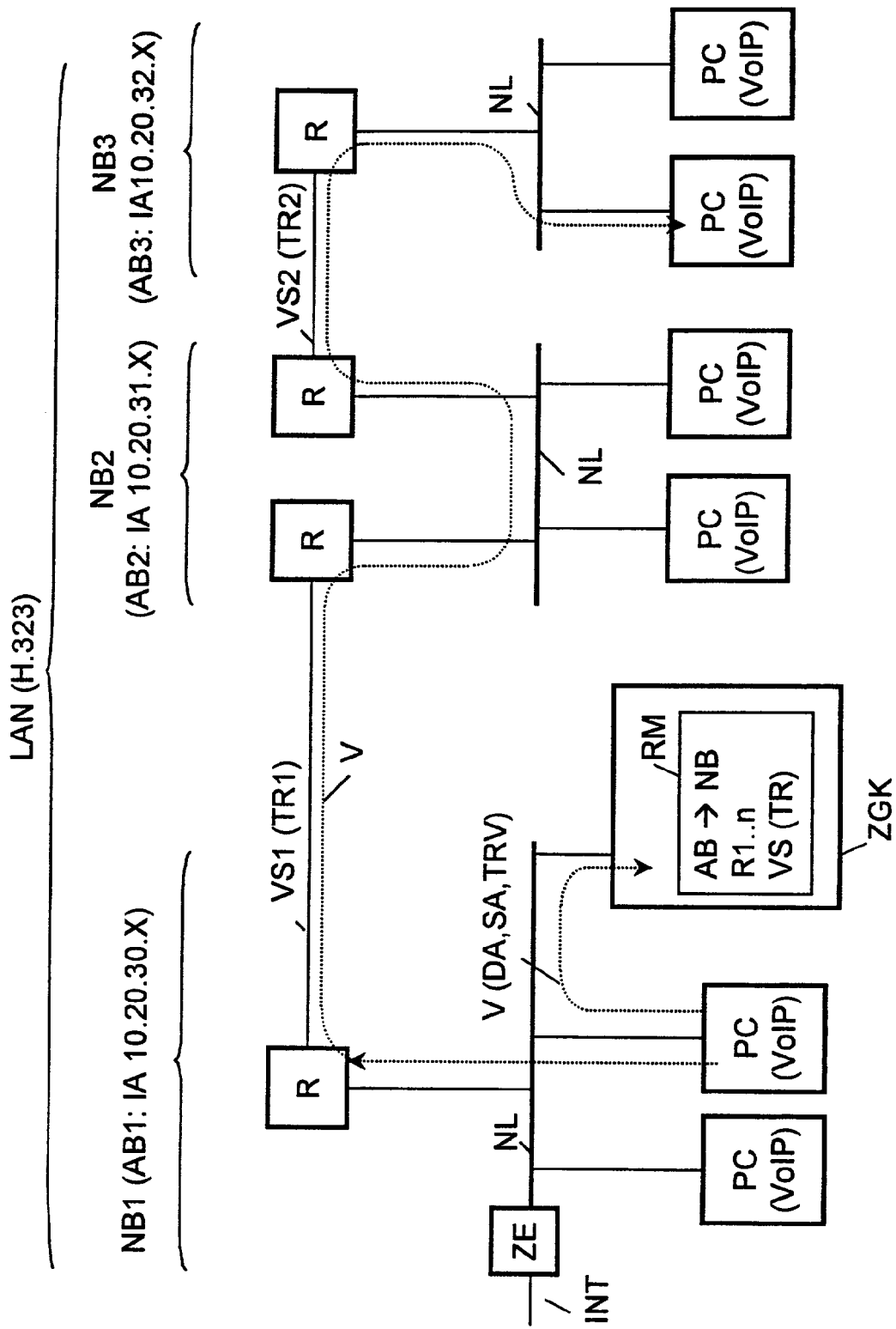
FIG. 1 is a block diagram of a packet-oriented network.

Reference will now be made in detail to the preferred embodiment of the present invention as illustrated in the accompanying drawing.

Illustrated in FIG. 1 is a packet-oriented local area network LAN formed by three subregions NB1 . . . 3. The first and second and the second and third subregions NB1 . . . 3 are respectively connected via a first and a second connection path VS1, 2, with the connection paths VS 1, 2 being connected to a router R in the respective subregions NB1 . . . 3. The router R is the linking element between the transmission networks NL of the subregions NB 1, 2 of the local area network LAN. The router R is used to recognize packets transmitted to another subregion NB1 . . . 3 on the basis of the source and destination addresses SA, DA indicated in the packets and to switch them through said subregion. In the illustrative embodiment, it may be assumed that a local area network LAN in the form of a bus is involved, with the bus-like transmission paths NL of the subregions NB1 . . . 3 being connected via the routers R and the connection path VS.

In addition, terminals in the form of personal computers PC are connected to the transmission paths NL of the subregions NB1 . . . 3. For the illustrative embodiment, it may also be assumed that the local area network LAN or the subregions NB1 . . . 3 are designed in accordance with ITU-T Standard H.323 and, for connection control and monitoring, the first subregion NB1 contains a central gatekeeper ZGK which performs these functions for the three subregions NB 1 . . . 3.

The first subregion NB1 is, by way of example, the central communication network of a company headquarters, and the second subregion NB2 is a branch office of this company, and the third subregion NB3 is a subnetwork of the branch office. It may also be assumed for the illustrative embodiment that the subregions NB1 . . . 3 of the local area network LAN are connected to the Internet INT via an access device ZE connected in the first subregion NB1. This means that not only the Internet links but also Voice over Internet links VoIP are initialized and routed among the personal computers PC or to the Internet INT. The local area network LAN may also be a subregion of the Internet, in which case the access device ZE can then be dispensed with.

Each of the terminals or personal computers PC and the central gatekeeper ZGK have both a physical Layer 2 address and an Internet address IA associated with them. For transmitting voice information within the local area network LAN and also to or from the Internet INT, a respective Voice over Internet function VoIP is provided in the terminals or personal computers PC.

According to the invention, the network, the local area network LAN in the illustrative embodiment, is provided with a resource manager RM. The resource manager RM in the illustrative embodiment is advantageously provided in the central gatekeeper ZGK—alternatively, it may also be allocated to the gatekeeper ZGK as server. If a plurality of gatekeepers are provided in the subregions NB1 . . . 3, then the resource manager RM needs to be allocated to one of these gatekeepers, with it also being possible for the resource manager RM to be arranged in another subregion NB, for example as server.

The resource manager RM contains a table which is subdivided into further subtables by the address range AB of the subregions NB1 . . . 3, by the possible routes R1 . . . n between the subregions NB1 . . . 3 and by the transmission system resources TR available between the subregions NB1 . . . 3. The subtables are organized as follows:

Address ranges AB of the subregions NB1 . . . 3:

For defining the address ranges AB, the first subranges of the Internet address IA are preferred. The ranges denoted by X can be arbitrary digit combinations.

| Address range AB | Subregion NB |
|---|---|
| 10.20.30.X | NB1 |
| 10.20.31.X | NB2 |
| 10.20.31.X | NB3 |

Routes R1 . . . n:

The subtable indicates the source and destination subregions NB1 . . . 3 and the subregion NB1 . . . 3 to which the initialized connection V is first signaled.

| Source NB | Destination NB | Next NB | VS |
|---|---|---|---|
| NB1 | NB2 | NB2 | VS1 |
| NB1 | NB3 | NB2 | VS1 |
| NB2 | NB3 | NB3 | VS2 |
| NB2 | NB1 | NB1 | VS1 |
| NB3 | NB2 | NB2 | VS2 |
| NB3 | NB1 | NB2 | VS2 |

Connection paths VS1, 2:

Here, those transmission system resources TR which are currently available are entered; the transmission system resources TR used by other connections V are respectively subtracted from the prescribed maximum transmission system resources TR. Similarly, at the end of a connection V, the transmission system resources TR1, 2 which become free on the connection paths VS1, 2 involved in the connection V which has been ended are subtracted again, i.e., are released again for other connections V.

| TR | NB | NB | Transmission system resources TR |
|---|---|---|---|
| 1 | NB1 | NB2 | 2000 kbit/s |
| 2 | NB2 | NB3 | 200 kbit/s |

When a connection V is initialized by a personal computer PC, this connection V is signaled or indicated to the central gatekeeper ZGK. In this case, a destination address and a source address DA, SA have been entered in the header of the packet indicating the initialization. Since the central gatekeeper ZGK is responsible for the three subregions NB1 . . . 3, connections V initialized by the first, second and third subregions NB1 . . . 3 are signaled to the central gatekeeper ZGK. In addition, the gatekeeper ZGK receives signaling indicating that the initialized connection V needs to have a bandwidth of 64 kbit/s, for example.

The central gatekeeper ZGK uses the destination and source addresses SA, DA and the subtable relating to the address ranges AB of the subregions NB1 . . . 3 to ascertain which subregion NB1 . . . 3 contains the personal computers PC. Next, the subtable relating to the routes R1 . . . n is used to ascertain the relevant route or routes R1 . . . n by a step-by-step procedure, if appropriate, in the table. In this context, the connection paths VS1, 2 used are also indicated. A check is carried out in the subtable of connection paths VS to determine whether the currently available transmission system resources TR1, 2 are sufficient for the initialized connection V with a requested transmission system resource TRV or a transmission speed of 64 kbit/s. According to the result of the check, the initialized connection V is either authorized or rejected by a notification to the personal computer PC initializing the connection V. If the connection V is authorized, the transmission system resources TR1, 2 are reserved in the routers R by an appropriate notification to the routers R and, if appropriate, in the access device ZE. The routers R then switch a packet for this connection V to the respective connection path VS1, 2. If, by way of example, a personal computer PC in the first subregion NB1 initializes a connection V having a bandwidth of 64 kbit/s to a personal computer PC in the third subregion NB3, the connection is authorized on the basis of the remaining free transmission system resources TR1, 2 of 2000 kbit/s or 200 kbit/s indicated in the subtable of connection paths VS 1, 2, the routes R . . . 1 being ascertained by a step-by-step procedure in the subtable of routes 1 . . . n. After the connection V has been initialized, the transmission system resources TR1, 2 used by the connection V are subtracted in the subtable of connection paths VS1, 2. If a connection is ended, the transmission system resources TR1, 2 used by the connection V are added again, according to the connection path VS1, 2 used.

To give preference to particular services, for example to the Voice over Internet service VoIP, a priority can be allocated to a group of personal computers PC within a subregion NB of the local area network LAN. This allocation of priorities can be achieved by subdividing the subregions NB1, 2 into further subregions and giving these subdivided subregions NB preferential treatment, that is to say handling them with priority during connection control in the central gatekeeper ZGK and in the routers R.

If a plurality of connection paths VS are provided between the subregions NB, then the prescribed or maximum available transmission system resources TR can be stored in the table of connection paths VS for each of the connection paths VS. In this context, with another subgroup of the subregions NB1 . . . 3, for example, each subgroup can be allocated a connection path VS or a portion of the transmission system resources TR of the connection path VS. Alternatively, the transmission system resources TR of all the connection paths VS may be regarded as a single transmission system resource for connections from one subregion NB1 to the other subregion NB2.

The subregions of the network NB1 . . . 2 can be subdivided into further subregions—not shown in the figure—, the further subregions each having been allocated a portion of the transmission system resources (TR1, 2) of the connection paths VS1, 2. This subdivision is indicated, in particular, in the subtable of connection paths VS1, 2. This means that, for different services, e.g., voice service, for example Voice over Internet and data service—, the quality of service or the prescribed transmission system resources can be determined differently for each service.

The method according to the invention can also be limited to a portion of the transmission system resources TR1, 2 of the connection paths VS1, 2. In this case, only a portion of the transmission system resources TRI, 2 are administered by the resource manager RM. The packets which are permitted to use this portion of the transmission system resources TR1, 2 are marked using particular bits. By way of example, in the local area network LAN, half of the transmission system resources TR1, 2 are reserved for voice packets, e.g., Voice over Internet packets, which are marked in the Internet header using a particular bit.

The method according to the invention and the resource manager according to the invention are not limited to this illustrative embodiment, but rather can be used in all packet-oriented networks having a plurality of subregions with a different geographical arrangement, it being possible for the subregions to be connected to one another by different connection paths—for example optical connection paths or radio links or infrared links. In addition, the method according to the invention can be implemented in subregion controllers in each of the subregions or else in one central controller for the entire packet-oriented network. In this context, there is merely a need for adjustments in line with the transmission protocols and initialization procedures used in the subregions and in the packet-oriented network.

What is claimed is:

1. A method for assuring quality of service of connections between a source and a destination subregion via an intermediate subregion in a packet-oriented network, where connection paths between subregions have prescribed transmission system resources, said method comprising:
    storing for access by a resource manager arranged in the packet-oriented network
        associated information relating to address ranges of the subregions,
        routes starting from the source subregion via the intermediate subregion to the destination subregion, and
        the transmission system resources between the subregions, but not within the subregions;
    signaling a requested scope of resources and source and destination addresses to the resource manager, when a connection is initialized;
    ascertaining in the resource manager a route through the network; and
    checking whether the connection to be initialized via the route is authorized in consideration of the requested scope of resources and the transmission system resources between the source subregion and the intermediate subregion and between the intermediate subregion and the destination subregion of the route, but not within the source, intermediate, and destination subregions of the route.

2. The method as recited in claim 1, further comprising reserving the transmission system resources for an initialized connection in the subregions included in an ascertained route.

3. The method as recited in claim 1,
    wherein the subregions of the network are subdivided into further subregions, and wherein said method further comprises allocating to each of the further subregions a portion of the transmission system resources of at least one connection path between the subregions.

4. The method as recited in claim 1, wherein the packet-oriented network is the Internet or an access network for the Internet.

5. The method as recited in claim 4, wherein the address ranges of the subregions are represented by subranges of an Internet address.

6. The method as recited in claim 1, wherein said storing for access by the resource manager includes storing a table for the routes with each entry for a route including an item of information relating to the source subregion, an item of information relating to the destination subregion, information relating to the subregions situated in between the source and destination subregions, and information relating to the connection paths arranged between the subregions of the respective routes.

7. The method as recited in claim 1, wherein the prescribed transmission system resources between the subregions are subdivided into prescribed transmission system partial resources for specific services, and wherein said checking includes determining authorization for an initialized connection associated with a specific service based on at least one partial resource for the specific service.

8. The method as recited in claim 1, further comprising obtaining in the resource manager a sum of the transmission system resources requested by the connection to be initialized and authorized for each connection path between the subregions, and wherein said checking does not result in authorization of an initialized connection having requested transmission system resources exceeding available transmission system resources of a connection path along the ascertained route, based on the sum of transmission system resources.

9. The method as recited in claim 1, further comprising signaling one of authorization and nonauthorization to a terminal initializing the connection.

10. The method as recited in claim 1, further comprising determining available transmission system resources using at least one of bandwidth information and a number of connections having prescribed bandwidth information.

11. The method as recited in claim 1, further comprising prescribing the transmission system resources for each connection path which together form the prescribed transmission system resources when there are a plurality of connection paths between the subregions.

12. The method as recited in claim 1, further comprising allocating different transmission priorities to the address ranges.

13. The method as recited in claim 1, further comprising assuring the quality of service of the connections in at least one of the subregions for at least one other subregion.

* * * * *